Patented Nov. 19, 1935

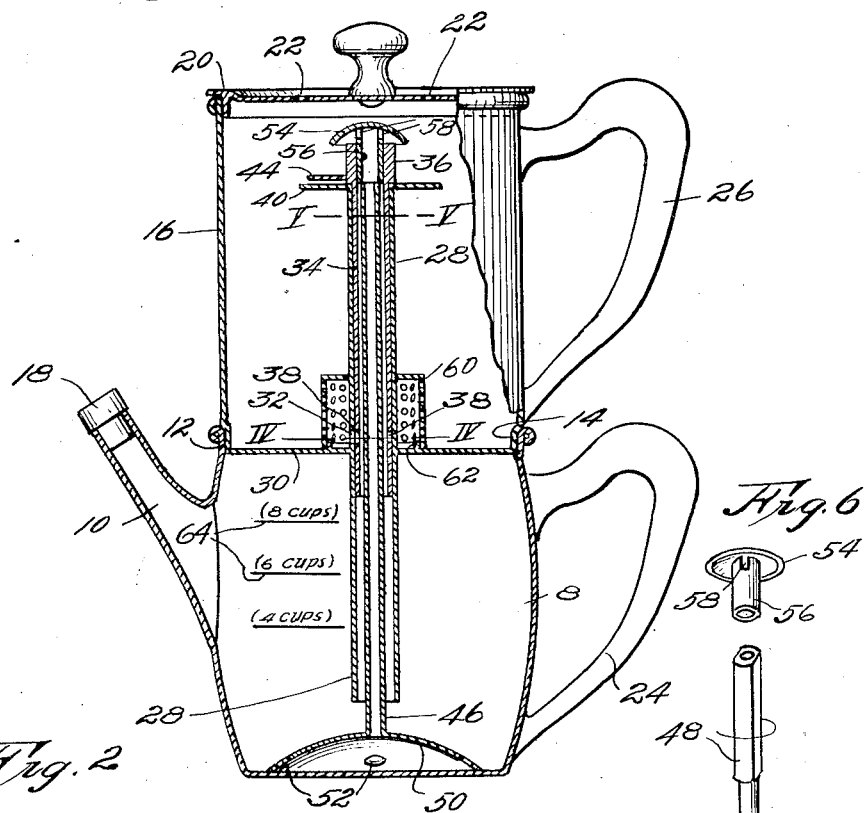

2,021,293

UNITED STATES PATENT OFFICE 2,021,293

DECOCTION APPARATUS

Roberto de Silva, Kansas City, Mo., assignor to Little Bear Specialties Company, a corporation of Missouri Application September 1, 1932, Serial No. 631,329

5 Claims. (Cl. 53—3)

This invention relates to a decoction apparatus of the percolator type, wherein coffee, tea, etc. is prepared, and the principal object of the invention is the production of a decoction apparatus comprising a heating compartment, a percolating compartment positioned thereabove, tubes interconnecting said compartments; and means associated with said tubes whereby the flow of fluid between said compartments is regulated through said tubes.

A further object of this invention is the provision of an automatic, audible signaling device to indicate a certain stage of the decoction operation.

Another object of the invention is to provide a decoction apparatus wherein water is forced from a heating compartment to a percolating compartment prior to the boiling of said water.

A still further object of the invention is the production of a device in which the parts are so constructed and arranged that they may be completely disassociated to facilitate proper and rapid cleaning. During the process of the preparation of coffee by this method it is very important that the temperature of the water and the time of infusion be accurately determined, and it is for these purposes that the present apparatus is designed.

Many other objects will appear during the course of the detailed specification, which specifically refers to the drawing, wherein:

Figure 1 is a side elevation, partly in section, of a decoction apparatus embodying this invention.

Fig. 2 is an enlarged, fragmentary, sectional view of the upper portion of the tubes, together with parts associated therewith.

Fig. 3 is a horizontal, sectional view, taken on line III—III of Fig. 2.

Fig. 4 is an enlarged, fragmentary, sectional view taken on line IV—IV of Fig. 1.

Fig. 5 is an enlarged, cross-sectional view taken on line V—V of Fig. 1.

Fig. 6 is a perspective view of the dome, and,

Fig. 7 is a perspective view of the inner tube.

Like reference characters designate similar parts throughout the several views, and the numeral 8 designates a heating compartment of any suitable size which is provided with the usual pouring spout 10 and having its upper portion 12 shaped to conform to the lower offset portion 14 of the percolating compartment 16, which fits snugly therein to form a substantially air-tight joint.

Plug 18 is adapted to seal spout 10, thus making it possible to create more or less pressure above the surface of the liquid in the heating compartment during certain periods of the process, as hereinafter set forth. The percolating compartment 16 is preferably cup-shaped with its upper open surface similar to that of the heating compartment so that cover 20 may be utilized to close either compartment. To prevent an accumulation of pressure in the percolating compartment, cover 20 is provided with openings 22, through which gases may escape.

For convenience of operation, compartments 8 and 16 are provided with suitable handles 24 and 26 respectively. Outer tube 28 extends through bottom 30 of percolating compartment 16 and is securely attached thereto by soldering or the like to form a tight joint. The upper end of this outer tube extends upwardly to a point adjacent the top of compartment 16, while its lower end, when in operative position, is positioned adjacent the lower portion of compartment 8 and in spaced apart relation from the bottom thereof.

An opening 32 is formed through tube 28 just above its connection with bottom 30. An intermediate tube 34, having a head 36, is adapted to snugly telescope inside tube 28, and is provided with a series of annularly disposed openings 38 which are in the plane of opening 32 when the head 36 of tube 34 rests on the upper end of tube 28.

It will be noted that one of the openings 38 is substantially the same size as opening 32 so that when these holes are in register, the flow of liquid through opening 32 is not limited; however, when another of the openings 38 is in register with opening 32, the amount of liquid that can pass through said registering openings is determined by the size of the smaller openings 38.

In order to facilitate the proper positioning of openings 38 relative to opening 32, the following means is provided. Removably attached to the upper end of stationary outer tube 28 is a disk 40, having divisional lines 42 which correspond respectively with certain openings 38. Tube 34 has securely attached thereto an indicating finger 44 which rotates therewith and permits of the proper relative positioning of the openings. Extending through, and in axial alignment with, tubes 28 and 34, is an inner tube 46. This tube is spaced apart from the inner wall of tube 34 and is provided with oppositely disposed lugs 48 which serve to maintain the tubes in proper relative relation without completely closing the passageway therebetween. The lower end 50 of tube 46 is outwardly flared to a bell-shape, as clearly shown in Fig. 1. Adjacent the outer edge of 50 is a series of suitable openings 52 which serve to admit the ingress egress of liquid. Tube 46 is supported in position by the bell-shaped portion resting on the bottom of the heating compartment 8 with its upper end extending to a point adjacent the upper end of intermediate tube 34.

A dome 54 is provided with a short, hollow stem 56 which is adapted to slidably fit in the upper end of tube 34 with its lower end positioned on top of the inner tube 46. When so positioned the stem serves to substantially close the passageways between the inner and intermediate tubes. Adjacent the upper end of stem 56 openings 58 are formed through the walls thereof. These openings are above the end of tube 54 to permit free passage of fluid therethrough at all times.

Referring to Figs. 1 and 2, it will be noted that the dome is spaced apart from the cover a distance less than the length of the insertion of the stem into tube 34 so that it will not be dislodged from the tube when it is raised to strike the cover as shown by dotted lines in Fig. 2.

A removable screen 60 is adapted to slide over tube 28 and rest on the bottom 30 of percolating compartment 16, with its lower edge engaging an annular flange 62 integral with base 30. This screen maintains the ground coffee in spaced relation from opening 32 to prevent clogging thereof.

For convenience of determining the exact quantity of coffee to be made, the inner wall of compartment 8 is provided with graduated horizontal lines 64, which are suitably indicated to show the number of cups of coffee that may be produced when compartment 8 is filled to a certain line.

The operation of this decoction apparatus is as follows: Compartment 8 is supplied with water of suitable quantity to produce the desired number of cups of coffee. Plug 18 is inserted in spout 10 to effectively seal the same. Compartment 16, with its associated parts, is then positioned in compartment 8, as shown in Fig. 1, thereby hermetically sealing the chamber formed above the upper surface of the water in the heating compartment.

A proper amount of coffee is then deposited in the percolating compartment and the cover 20 is placed in operative position. Heat is then applied to the bottom of heating compartment 8, thereby raising the temperature of the water and also the temperature of the air in the chamber above the water level. As the air in heating compartment 8 expands with the heating, a pressure is created above the surface of the water sufficient to force a portion of said water into tube 28 and through openings 38 and 32, which have been properly registered to produce coffee of the desired strength. This transfer of water from compartment 8 to compartment 16 is produced before the temperature in the heating compartment is sufficient to cause the formation of steam and will continue so long as the pressure of the air in the heating compartment is sufficient to force the water into compartment 16. Due to the fact that prior to the application of heat to compartment 8 and before a sufficient temperature has been reached to cause boiling of the water, the quantity of gas will remain the same, while its volume will be increased as the water is discharged from said compartment, this differential of volume will eventually cause a sufficient decrease of the pressure to a point where it will not be sufficient to force any more liquid into compartment 16. With a continued application of heat to compartment 8, steam will be created above the surface of the remaining water in this compartment, thus producing a pressure sufficient to force water through tubes 28 and 34 into compartment 16 by way of screen 60. When the water level in compartment 8 is lowered to the bottom of tube 28, steam will be created above the surface of the remaining water in this compartment, thus producing a pressure sufficient to force water through tube 46 into compartment 16. When the water level in compartment 8 is lowered to the bottom of tube 28, steam from compartment 8 will rush into tube 28 between tubes 34 and 46, thereby exerting sufficient pressure against dome 54 to cause it to be forced upwardly against cover 20 to cause an audible signal.

When the dome is thus raised the pressure will be relieved sufficiently to permit the settling of dome 54 until stem 56 again seals the passageway between tubes 34 and 46 so that the steam pressure will again be built up and cause the dome to again be lifted. This intermittent raising and lowering of dome 54 continues for a period of time, thus indicating to the operator that most of the water has been transferred to the percolating compartment. That portion of water below the level of tube 28 is transferred to compartment 16 through tube 46 by the action of heat thereon by the well known percolating process. Water flows into the space formed between the bottom of compartment 8 and the flared end of tube 46 through openings 52.

During this percolating process the dome may be caused to move to produce the audible signaling. When the water is completely transferred to the percolating compartment and the pressure in compartment 8 is reduced by the diminishing or elimination of the application of heat, the prepared coffee will flow through registered openings 32 and 38, through lower parts of tubes 34 and 28 to compartment 8. The time required for this transfer is the determining factor as to the strength of the coffee. Should it be found desirable to increase the strength of the decoction after the above operation has been completed, heat may again be applied, thus causing the above operation to be repeated.

It should be noted that the coffee is not at any time subjected to boiling water. This is due to the fact that a portion of the water is transferred from the heating compartment to the percolating compartment before it has reached the boiling temperature; however, it is apparent that by the application of an extreme amount of heat it would be possible to cause a boiling of the water in the percolating compartment. After the coffee has been prepared, compartment 14 with its associated parts, may be removed and the cover 20 fitted to position on compartment 8.

When all of the liquid has been transferred from the heating compartment to the percolating compartment, the signaling device will discontinue its operation, due to the fact that there will be no flow of fluid to the percolating compartment sufficient to raise and lower the dome. This period of rest of the signaling device will continue for a considerable period, even though the heat is not turned off.

With the liquid in the percolating compartment and the absence of liquid in the heating compartment, a flow of liquid from the percolating compartment will be set up through openings 32 and 38 downwardly between tubes 28 and 46, due to the action of gravity. The temperature of this liquid is below the boiling point and flows into the heating compartment at a sufficient rate of speed to preclude the immediate formation of steam, thereby permitting the flow of most of the liquid from the percolating compartment before sufficient pressure is set up in the heating compartment to cause a reverse flow to the percolating compartment. However, after the signaling device has ceased its action, the heat may be regulated or entirely eliminated from the heating compartment, thereby precluding any possible chance of returning the liquid to the percolating compartment.

It is very apparent that by means of the proper control of the heat, that this process may be greatly varied to produce any desired strength of coffee.

While the transfer tubes have been shown in axial alignment, it is apparent that they may be otherwise positioned without altering the operation thereof. Furthermore, any changes might be made in the construction of this apparatus without departing from the spirit of my invention.

Having thus described the invention, what is claimed as new and desired to be secured by Letters Patent is:

1. In a decoction apparatus, a heating compartment; a percolating compartment positioned above said heating compartment; a plurality of spaced-apart tubes interconnecting said compartments with their lower ends positioned in said heating compartment in vertical offset relation; an opening formed in one of said tubes intermediate its ends and positioned to communicate with the percolating compartment adjacent the bottom thereof; and a rotatable tubular sleeve having a series of graduated openings formed in its wall positioned to be selectively registered with the first mentioned opening, whereby the flow of liquid therethrough is controlled.

2. In a decoction apparatus, a heating compartment; a percolating compartment positioned above said heating compartment; a plurality of spaced-apart tubes interconnecting said compartments with their lower ends positioned in said heating compartment in vertical offset relation; an opening formed in one of said tubes intermediate its ends and positioned to communicate with the percolating compartment adjacent the bottom thereof; a rotatable tubular sleeve having a series of graduated openings formed in its wall positioned to be selectively registered with the first mentioned opening, whereby the flow of liquid therethrough is controlled; and means associated with said perforated tube and sleeve whereby the relative position of said openings is indicated.

3. Decoction apparatus of the character described comprising, in combination, a vessel having a heating compartment in the lowermost part thereof to receive water to be heated and a percolating compartment in the uppermost part into which the water is forced as heat is applied to the lower portion of the vessel; a partition separating said compartments and having an opening formed therethrough; a tube extending through said opening into said heating compartment from the said partition to a point above the bottom of the vessel and into said percolating compartment to a point near the top thereof to carry water from the heating compartment to the percolating compartment; an opening formed in said tube within the lower part of the percolating compartment; a tube within said first mentioned tube having a plurality of holes of different diameters each equal to or smaller than the diameter of the opening in the first mentioned tube and successively registerable therewith as the inner tube is turned; and another tube within and spaced from the said inner tube extending from the bottom of the heating compartment to the upper end of the first mentioned tube to convey water from below the bottom of the first mentioned tube within the heating compartment to the percolating compartment past said openings in the other tubes; the registering openings of the two first mentioned tubes determining the speed of the flow of all the water from the said percolating compartment, to the heating compartment.

4. Decoction apparatus of the character described comprising, in combination, a vessel having a heating compartment in the lowermost part thereof to receive water to be heated and a percolating compartment in the uppermost part into which the water is forced as heat is applied to the lower portion of the vessel; a partition separating said compartments and having an opening formed therethrough; a tube extending through said opening into said heating compartment from the said partition to a point above the bottom of the vessel and into said percolating compartment to a point near the top thereof to carry water from the heating compartment to the percolating compartment; an opening formed in said tube within the lower part of the percolating compartment; a tube within said first mentioned tube having a plurality of holes of different diameters each equal to or smaller than the diameter of the opening in the first mentioned tube and successively registerable therewith as the inner tube is turned; and another tube within and spaced from the said inner tube extending from the bottom of the heating compartment to the upper end of the first mentioned tube to convey water from below the bottom of the first mentioned tube within the heating compartment to the percolating compartment past said openings in the other tubes, the water being forced to the percolating compartment from the heating compartment through all of said tubes and the space between the innermost tube and perforated tubes serving as the passage to return the water from the percolating compartment whereby the speed of the flow of water back to the heating compartment is predetermined.

5. In a decoction apparatus, a heating compartment; a percolating compartment positioned above said heating compartment; an outer tube secured to and extending through the bottom of said percolating compartment with its upper end adjacent the upper portion of said percolating compartment and its lower end extending to the lower portion of the heating compartment; an opening through the wall of said tube intermediate its ends and communicating with the lower portion of said percolating compartment; an inner tube extending into said outer tube with its outer wall in spaced-apart relation to the inner wall thereof to form a passageway therebetween and with its lower end extending below the lower end of said outer tube and its upper end positioned above said opening in the outer tube; and a reciprocable member seated over the upper end of said inner tube movable as steam is forced through the said inner tube from that portion of the heating compartment below the bottom of the first mentioned tube after water from that portion of the heating compartment above the bottom of the first mentioned tube has been forced into the percolating compartment through the opening in the wall thereof.

ROBERTO DE SILVA.